US012291638B2

(12) United States Patent
Alkan et al.

(10) Patent No.: US 12,291,638 B2
(45) Date of Patent: May 6, 2025

(54) POLYAMIDE COMPOUNDS, MOLDS PRODUCED THEREFROM AND USE OF THE POLYAMIDE COMPOUNDS

(71) Applicant: EMS-CHEMIE AG, Domat/Ems (CH)

(72) Inventors: Arda Alkan, Domat/Ems (CH); Andri Cadalbert, Bonaduz (CH); Andreas Bayer, Domat/Ems (CH); Botho Hoffmann, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 0 days.

(21) Appl. No.: 17/551,547

(22) Filed: Dec. 15, 2021

(65) Prior Publication Data
US 2022/0204764 A1 Jun. 30, 2022

(30) Foreign Application Priority Data
Dec. 17, 2020 (EP) .................... 20215165

(51) Int. Cl.
C08L 77/06 (2006.01)
C08G 69/26 (2006.01)

(52) U.S. Cl.
CPC ............ C08L 77/06 (2013.01); C08G 69/26 (2013.01)

(58) Field of Classification Search
CPC ........ C08G 69/26; C08G 69/265; C08K 5/56; C08L 23/0869; C08L 23/0876; C08L 23/0892; C08L 31/02; C08L 33/064; C08L 33/066; C08L 33/068; C08L 77/06
See application file for complete search history.

(56) References Cited

U.S. PATENT DOCUMENTS

| | | | |
|---|---|---|---|
| 3,766,131 A | 10/1973 | Arkles | |
| 6,482,889 B1 | 11/2002 | Kurz | |
| 7,723,411 B2 | 5/2010 | Schneider | |
| 7,973,191 B2 | 7/2011 | Doring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stöppelmann et al. | |
| 8,993,662 B2 | 3/2015 | Kaplan | |
| 9,109,115 B2 | 8/2015 | Buhler et al. | |
| 9,133,322 B2 | 9/2015 | Roth et al. | |
| 9,359,532 B2 | 6/2016 | Kaplan | |
| 9,453,106 B2 | 9/2016 | Buhler et al. | |
| 9,644,081 B2 | 5/2017 | Aepli et al. | |
| 9,663,655 B2 | 5/2017 | Aepli | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 10,005,268 B2 | 6/2018 | Jeltsch et al. | |
| 10,047,054 B2 | 8/2018 | Kaplan | |
| 10,144,805 B2 | 12/2018 | Bayer et al. | |
| 10,233,326 B2 | 3/2019 | Koch et al. | |
| 10,544,286 B2 | 1/2020 | Nakano et al. | |
| 10,577,478 B2 | 3/2020 | Fujii et al. | |
| 10,683,418 B2 | 6/2020 | Thomas et al. | |
| 10,717,816 B2 | 7/2020 | Aepli et al. | |
| 10,751,961 B2 | 8/2020 | Cheung | |
| 10,767,047 B2 | 9/2020 | Aepli et al. | |
| 10,767,048 B2 | 9/2020 | Aepli et al. | |
| 10,836,905 B2 | 11/2020 | Wiedemann et al. | |
| 10,843,389 B2 | 11/2020 | Weis et al. | |
| 10,882,975 B2 | 1/2021 | Stöppelmann | |
| 10,889,713 B2 | 1/2021 | Schubert et al. | |
| 10,899,527 B2 | 1/2021 | Sütterlin et al. | |
| 10,927,254 B2 | 2/2021 | Stöppelmann et al. | |
| 11,059,950 B2 | 7/2021 | Holzschuh et al. | |
| 11,091,590 B2 | 8/2021 | Hoffmann et al. | |
| 11,098,194 B2 | 8/2021 | Aepli et al. | |
| 11,186,716 B2 | 11/2021 | Sütterlin et al. | |
| 11,254,083 B2 | 2/2022 | Caviezel | |
| 11,254,794 B2 | 2/2022 | Holzschuh et al. | |
| 11,274,204 B2 | 3/2022 | Wiedemann | |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2010/0069657 A1 | 3/2010 | Doring et al. | |
| 2010/0168423 A1 | 7/2010 | Doring et al. | |
| 2010/0279111 A1 | 11/2010 | Harder et al. | |

(Continued)

FOREIGN PATENT DOCUMENTS

CN 104017363 A * 9/2014
CN 109777097 A 5/2019

(Continued)

OTHER PUBLICATIONS

US 10,875,999 B2, 12/2020, Stöppelmann et al. (withdrawn)
US 11,332,575 B2, 05/2022, Aepli et al. (withdrawn)
CN 104017363 A machine translation (Sep. 2014).*
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.

(Continued)

Primary Examiner — Ana L. Woodward
(74) Attorney, Agent, or Firm — Leydig, Voit & Mayer, Ltd.

(57) ABSTRACT

The present invention relates to polyamide compounds having high heat aging resistance which, in addition to a specific polyamide, comprise at least one unsubstituted or substituted metallocene, optionally at least one impact modifier and optionally at least one additive. The invention also relates to the use of said polyamide compounds for the production of molds.

15 Claims, No Drawings

(56) References Cited

U.S. PATENT DOCUMENTS

| | | |
|---|---|---|
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0136911 A1 | 5/2013 | Bender et al. |
| 2013/0317168 A1 | 11/2013 | Buhler et al. |
| 2014/0011925 A1* | 1/2014 | Pauchard ............. C08K 5/5313 524/126 |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Buhler et al. |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251600 A1 | 9/2018 | Hoffmann et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Caviezel |
| 2021/0032464 A1 | 2/2021 | Stöppelmann |
| 2021/0032465 A1 | 2/2021 | Wiedemann et al. |
| 2021/0032466 A1 | 2/2021 | Stöppelmann |
| 2021/0040264 A1 | 2/2021 | Harder et al. |
| 2021/0040317 A1 | 2/2021 | Harder et al. |
| 2021/0115250 A1 | 4/2021 | Wiedemann et al. |
| 2021/0189124 A1 | 6/2021 | Alkan et al. |
| 2021/0189125 A1 | 6/2021 | Alkan et al. |

FOREIGN PATENT DOCUMENTS

| | | |
|---|---|---|
| EP | 1 681 313 A1 | 7/2006 |
| EP | 2 535 365 A1 | 12/2012 |
| EP | 2 902 444 A1 | 8/2015 |
| WO | WO 2019/212416 A1 * | 7/2019 |

OTHER PUBLICATIONS

U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,891, filed Mar. 2, 2018.
U.S. Appl. No. 15/955,737, filed Apr. 18, 2018.
U.S. Appl. No. 16/094,198, filed Oct. 16, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.
U.S. Appl. No. 16/115,055, filed Aug. 28, 2018.
U.S. Appl. No. 16/515,119, filed Jul. 18, 2019.
U.S. Appl. No. 16/515,151, filed Jul. 18, 2019.
U.S. Appl. No. 16/595,559, filed Oct. 8, 2019.
U.S. Appl. No. 16/717,369, filed Dec. 17, 2019.
U.S. Appl. No. 16/956,564, filed Jun. 20, 2020.
U.S. Appl. No. 16/956,576, filed Jun. 20, 2020.
U.S. Appl. No. 16/956,579, filed Jun. 20, 2020.
U.S. Appl. No. 16/956,580, filed Jun. 20, 2020.
U.S. Appl. No. 16/987,913, filed Aug. 7, 2020.
U.S. Appl. No. 16/988,011, filed Aug. 7, 2020.
U.S. Appl. No. 17/129,507, filed Dec. 21, 2020.
U.S. Appl. No. 17/129,606, filed Dec. 21, 2020.
U.S. Appl. No. 17/551,371, filed Dec. 15, 2021.
U.S. Appl. No. 09/533,280, filed Mar. 22, 2000.
U.S. Appl. No. 10/536,494, filed May 24, 2005.
U.S. Appl. No. 10/553,259, filed Oct. 11, 2005.
U.S. Appl. No. 11/950,964, filed Dec. 5, 2007.
U.S. Appl. No. 12/091,024, filed Apr. 21, 2008.
U.S. Appl. No. 12/539,972, filed Aug. 12, 2009.
U.S. Appl. No. 12/540,007, filed Aug. 12, 2009.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/290,718, filed Nov. 7, 2011.
U.S. Appl. No. 13/421,541, filed Mar. 15, 2012.
U.S. Appl. No. 13/481,451, filed May 25, 2012.
U.S. Appl. No. 13/674,395, filed Nov. 12, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/078,134, filed Nov. 12, 2013.
U.S. Appl. No. 14/204,404, filed Mar. 11, 2014.
U.S. Appl. No. 14/205,667, filed Mar. 12, 2014.
U.S. Appl. No. 14/221,930, filed Mar. 21, 2014.
U.S. Appl. No. 14/397,529, filed Oct. 28, 2014.
U.S. Appl. No. 14/397,534, filed Oct. 28, 2014.
U.S. Appl. No. 14/504,651, filed Oct. 2, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.

* cited by examiner

POLYAMIDE COMPOUNDS, MOLDS PRODUCED THEREFROM AND USE OF THE POLYAMIDE COMPOUNDS

This patent application claims the benefit of European Patent Application No. 20 215 165.0, filed on Dec. 17, 2020, the disclosure of which is incorporated herein by reference in its entirety for all purposes.

The present invention relates to polyamide compounds having high heat aging resistance which, in addition to a specific polyamide, contain at least one unsubstituted or substituted metallocene, optionally at least one impact modifier and optionally at least one additive. The invention also relates to the use of said polyamide compounds for the production of molds.

Polyamides can be used as materials for molds that are exposed to elevated temperatures during their service life. Improvement in heat aging resistance of polyamides is extremely desirable, since it enables longer service lives for thermally stressed components to be achieved and the risk of their failure to be reduced. Alternatively, improved heat aging resistance can also enable the components to be used at higher temperatures.

Thermoplastic polyamides can be used as construction materials for components that are exposed to elevated temperatures during their service life. Since this exposure leads to thermo-oxidative damage, heat stabilizers that delay the occurrence of thermo-oxidative damage are used.

Long-term heat-stabilized polyamide compounds are known from EP 2 535 365 A1, in which compounds based on a partially aromatic polyamide and caprolactam are used, which compounds are provided with copper stabilizers or with mixtures of copper and organic stabilizers.

EP 2 902 444 A1 also relates to long-term heat-stabilized compounds based on a partially aromatic polyamide and caprolactam. Long-term heat stabilization is achieved here through the use of organic stabilizers.

EP 1 681 313 A1 also describes compounds having long-term heat stabilization. Long-term heat stabilization is achieved here by using at least two special heat stabilizers (for example, copper iodide and iron oxide) and by using two polyamides which differ their melting points by at least 20° C.

Proceeding from this, it was the object of the present invention to provide polyamide compounds from which molds can preferably be produced, which molds are distinguished particularly by improved heat aging resistance compared with polyamide compounds known from the prior art.

This object is achieved by the polyamide compound described herein and the molds also described. Advantageous developments and uses according to the invention are also described.

According to the invention, a polyamide compound containing or consisting of the following components (A) to (D) is provided:
(A) 32 to 99.99 wt. % of at least one partially crystalline, partially aromatic polyamide,
(B) 0 to 30 wt. % of at least one functionalized impact modifier,
(C) 0.01 to 3.0 wt. % of at least one unsubstituted or substituted metallocene,
(D) 0 to 35 wt. % of at least one additive,
wherein components (A) to (D) add up to 100 wt. %.

Surprisingly, it was found that the use of metallocenes, particularly ferrocenes, in conjunction with the at least one partially crystalline, partially aromatic polyamide can achieve significantly improved heat aging resistance.

The ferrocene-containing polyamide compounds according to the invention show markedly improved flowability in the spiral flow test.

Definitions of Terms

Designations and Abbreviations for Polyamides and the Monomers Thereof

In the sense of the present invention, the term "polyamide" (abbreviation PA) is understood as an umbrella term; it comprises homopolyamides and copolyamides. The selected spellings and abbreviations for polyamides and their monomers correspond to those specified in ISO standard 16396-1 (2015, (D)). The abbreviations used therein are used hereafter synonymously for the IUPAC names of the monomers. In particular, the following abbreviations for monomers appear in the present application: 6 for 1,6-hexanediamine (CAS No. 124-09-4), T for terephthalic acid (CAS No. 100-21-0), I for isophthalic acid (CAS No. 121-95-5), 6 for 1,6-hexanedioic acid (CAS No. 124-04-9), 6 for caprolactam (CAS No. 105-60-2), MACM for bis(4-amino-3-methyl-cyclohexyl)methane (also referred to as 3,3'-dimethyl-4,4'-diaminodicyclohexylmethane, CAS No. 6864-37-5), TMDC for bis(4-amino-3,5-dimethyl-cyclohexyl)methane (also referred to as 3,3',5,5'-tetramethyl-4,4'-diaminodicyclohexylmethane, CAS No. 65962-45-0), PACM for bis(4-amino-cyclohexyl)methane (also referred to as 4,4'-diaminodicyclohexylmethane, CAS No. 1761-71-3), BAC for 1,3-bis(aminomethyl)-cyclohexane (also referred to as 1,3-cyclohexanedimethanamine, CAS No. 2579-20-6) and for 1,4-bis(aminomethyl)cyclohexane (also referred to as 1,4-cyclohexanedimethanamine, CAS No. 2549-93-1) and for their mixtures, IPD for isophoronediamine (also referred to as 3-(aminomethyl)-3,5,5-trimethyl-cyclohexanamine, 1-amino-3-aminomethyl-3,5,5-trimethyl-cyclohexane or cyclohexanemethanamine, 5-amino-1,3,5,5-trimethyl-, CAS No. 2855-13-2), MPMD for 2-methyl-1,5-pentanediamine (also referred to as 1,5-diamino-2-methylpentane, CAS No. 15520-10-2), MOD for 2-methyl-1,8-octanediamine (also referred to as 2-methyloctane-1,8-diamine, CAS No. 148528-05-6), 12 for dodecanedioic acid (also referred to as 1,10-decanedicarboxylic acid, CAS No. 693-23-2), CHD for cyclohexanedicarboxylic acid, 12 for lactam-12 (also referred to as laurolactam, CAS No. 947-04-6).

General Information about the Compositions

The terms "containing" and "comprising" in the present claims and in the description mean that further components are not excluded. In the context of the present invention, the term "consisting of" is to be understood as a preferred embodiment of the terms "containing" or "comprising". If there is a definition that a group "contains" or "comprises" at least a certain number of components, this is also to be understood such that a group is disclosed which preferably "consists" of these components.

Quantity Information of the Monomers

If the polyamides (A1) only comprise diacids and diamines, their molar fractions add up to 50 mol % for the sum of all diamines and 50 mol % for the sum of all diacids and the sum of the diamine and diacid fractions results in 100 mol % for the polyamide.

If the polyamides (A1) or (A2) comprise x mol % of lactams or ω-amino acids in addition to diacids and diamines, the sum of all diamines is only (50-0.5x) mol % and the sum of all diacids (50-0.5x) mol %, based on 100 mol % polyamide.

With respect to the quantity information regarding the diacids and diamines of the polyamides, it always applies that the sum of the molar fractions of all diamines is equal to the sum of the molar fractions of all diacids.

General Information on the Quantity Information

The polyamide compounds according to the present invention comprise or consist of components (A) and (C) and, optionally, (B) and/or (D), provided that the components (A), (B), (C) and (D) add up to a total of 100 wt. %. The specified ranges of the quantities for the individual components (A), (B), (C) and (D) are to be understood such that an arbitrary amount can be selected for each of the individual components within the specified ranges, provided that the requirement is met that the sum of all components (A), (B), (C) and (D) is 100 wt. %.

Partly Crystalline, Partly Aromatic Polyamides

In the sense of the present invention, partially aromatic polyamides are those polyamides which comprise at least one aromatic monomer. Said at least one aromatic monomer is preferably a dicarboxylic acid. In the sense of the present invention, metaxylylenediamine (MXD, CAS No. 1477-55-0) and paraxylylenediamine (PXD, CAS No. 539-48-0) are not aromatic monomers. This also applies to all other monomers in which the amino or carboxy groups are not attached directly to the aromatic ring. The partially crystalline, partially aromatic polyamides of the present invention have a melting temperature and a heat of fusion which can be determined using dynamic differential scanning calorimetry (DSC) according to ISO 11357-3 (2013).

Metallocenes

Metallocenes are coordination compounds, namely complexes, so-called sandwich complexes. They are therefore neither a metal oxide nor a metal salt.

One representative is, for example, unsubstituted or substituted bis($\eta^5$-cyclopentadienyl)iron. Bis($\eta^5$-cyclopentadienyl)iron is also referred to as ferrocene (CAS No. 102-54-5). Both terms are used synonymously in this application.

Heat Aging Resistance

Good heat aging resistance is shown by the slowing down of the decrease in tear strength and/or elongation at break after storage of the mold at elevated temperatures, that is, temperatures of at least 100° C., preferably at least 120° C., more preferably at least 140° C.

Polyamide Compound

The polyamide compound according to the invention comprises components (A), (C) and optionally (B) and/or (D) or consists of these.

The polyamide compound according to the invention comprises or consists of the following components:
- (A) 32 to 99.99 wt. % of at least one partially crystalline, partially aromatic polyamide,
- (B) 0 to 30 wt. % of at least one functionalized impact modifier,
- (C) 0.01 to 3.0 wt. % of at least one unsubstituted or substituted metallocene,
- (D) 0 to 35 wt. % of at least one additive, wherein components (A) to (D) add up to 100 wt. %.

The fraction of component (A) in the polyamide compound is preferably in the range from 43 to 94.87 wt. %, more preferably in the range from 53.5 to 89.6 wt. %, based on the total weight of the polyamide compound.

The fraction of component (B) in the polyamide compound is preferably in the range from 5 to 25 wt. %, more preferably in the range from 10 to 20 wt. %, based on the total weight of the polyamide compound.

The fraction of component (C) in the compound is preferably in the range from 0.03 to 2.0 wt. %, more preferably from 0.1 to 1.5 wt. %, based on the total weight of the polyamide compound.

The fraction of component (D) in the compound is preferably in the range from 0.1 to 30 wt. %, more preferably from 0.3 to 25 wt. %, based on the total weight of the polyamide compound.

The individual components of the polyamide compound according to the invention are described in more detail below.

Component (A)

According to a preferred embodiment of the present invention, the at least one partially crystalline, partially aromatic polyamide (A) has:
- a relative viscosity (RV), measured according to EN ISO 307 (2007), of 1.45 to 2.10, preferably from 1.50 to 1.90, more preferably from 1.55 to 1.80, and/or
- a heat of fusion, measured according to EN ISO 11357-3 (2013), of at least 25 J/g, preferably at least 30 J/g, more preferably at least 35 J/g, and/or
- a melting temperature, measured according to EN ISO 11357-3 (2013), of at least 255° C., preferably 270° C. to 350° C., more preferably from 280 to 340° C.

According to a preferred embodiment of the present invention, the at least one partially crystalline, partially aromatic polyamide (A) is formed from the monomers (a1) to (a2) and optionally (a3) and optionally (a4):
- (a1) at least one diamine selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl)methane, bis(4-amino-3-methyl-cyclohexyl)methane, bis(4-amino-3,5-dimethyl-cyclohexyl)methane, bis(aminomethyl)cyclohexane, isophoronediamine, m-xylylenediamine and p-xylylenediamine, and
- (a2) at least one aromatic dicarboxylic acid selected from the group consisting of terephthalic acid, isophthalic acid and naphthalenedicarboxylic acid, and/or
- (a3) at least one dicarboxylic acid selected from the group consisting of 1,6-hexanedioic acid, 1,9-nonanedioic acid, 1,10-decanedioic acid, 1,12-dodecanedioic acid, 1,13-tridecanedioic acid, 1,14-tetradecanedioic acid, 1,15-pentadecandoic acid, 1,16-hexadecanedioic acid, 1,17-heptadecanedioic acid, 1,18-octadecanedioic acid, cyclohexanedicarboxylic acid and dimeric fatty acid having 36 or 44 C atoms, and/or
- (a4) one or more lactams or ω-amino acids selected from the group consisting of lactam-6, lactam-11, lactam-12, 1,6-aminohexanoic acid, 1,11-aminoundecanoic acid and 1,12-aminododecanoic acid.

According to a particularly preferred embodiment of the present invention, the at least one partially crystalline, partially aromatic polyamide (A) is formed from the monomers (a1) to (a2) and optionally (a3) and optionally (a4):
- (a1) at least one diamine selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl)methane, bis(4-amino-3-methyl-cyclohexyl)methane and bis(aminomethyl)cyclohexane, and (a2) at least one aromatic dicarboxylic acid selected from the group consisting of terephthalic acid and isophthalic acid, and/or (a3) at least one dicarboxylic acid selected from the group consisting of 1,6-hexanedioic acid, 1,10-decanedioic acid, 1,12-dodecanedioic acid and 1,16-hexadecanedioic acid, and/or (a4) one or more lactams or ω-amino acids selected from the group consisting of lactam-6, lactam-12, 1,6-aminohexanoic acid and 1,12-aminododecanoic acid.

According to a particularly preferred embodiment of the present invention, the at least one partially crystalline, partially aromatic polyamide (A) is formed from the monomers (a1) to (a2) and optionally (a3):

(a1) at least one diamine selected from the group consisting of 1,6-hexanediamine, 1,10-decanediamine and bis(aminomethyl)cyclohexane, and (a2) at least one aromatic dicarboxylic acid selected from the group consisting of terephthalic acid and isophthalic acid, and/or (a3) at least one dicarboxylic acid selected from the group consisting of 1,6-hexanedioic acid, 1,10-decanedioic acid and 1,12-dodecanedioic acid.

According to a further preferred embodiment of the present invention, the at least one partially crystalline, partially aromatic polyamide (A) comprises:

at least 10 mol %, preferably at least 20 mol %, more preferably at least 25 mol % 1,6-hexanediamine, and at least 10 mol %, preferably at least 20 mol %, more preferably at least 25 mol % terephthalic acid.

According to a further preferred embodiment of the present invention, the at least one partially crystalline, partially aromatic polyamide (A) is selected from the group consisting of:

PA 4T/66, PA 4T/6T, PA 4T/8T, PA 6T/8T, PA 4T/MPMDT, PA 4T/6T/MPMDT, PA 4T/4I, PA 4T/6I, PA 5T/5I, PA 6T/MPMDT, PA 6T/MPMDT/6I, PA 6T/6I, PA 6T/66, PA 6T/6, PA 6T/12, PA 6T/66/6, PA 6T/610, PA 6T/612, PA 6T/10I, PA 6T/9T, PA 6T/12T, PA 6T/6I/6, PA 6T/6I/66, PA 6T/6I/612, PA 6T/6I/12, PA 9T/MODT, PA 9T/9I, PA 10T, PA 12T, PA 12T/12I, PA 10T/1012, PA 10T/6T, PA 10T/10I, PA10T/106, PA10T/12, PA10T/11, PA 10T/6T/612, PA 10T/6T/10I/6I, PA 10T/6T/1012/612, PA 6T/BACT, PA 6T/BACT/66, PA 6T/6I/BACT/BACI, PA 6T/BACT/MACMT, PA 6T/BACT/PACMT, PA 6T/BACT/TMDCT, PA 4T/6T/8T, PA 4T/6T/10T, PA 4T/8T/10T, PA 6T/8T/10T and their copolyamides, more preferably selected from the group consisting of PA 6T/MPMDT, PA 6T/6I, PA 6T/66, PA 6T/6, PA 6T/12, PA 6T/66/6, PA 6T/6I/6, PA 6T/6I/66, PA 6T/6I/612, PA 9T/MODT, PA 10T, PA 12T, PA 10T/1012, PA 10T/6T, PA 10T/10I, PA 10T/6T/612, PA 10T/6T/10I/6I, PA 10T/6T/1012/612, PA 6T/BACT, PA 6T/BACT/66, PA 6T/BACT/MACMT and PA 6T/BACT/PACMT, even more preferably selected from the group consisting of PA 6T/6I, PA 6T/66, PA 6T/66/6, PA 6T/6I/66, PA 6T/6I/612, PA 10T/1012, PA 10T/6T, PA 10T/6T/612, PA 10T/6T/10I/6I, PA 10T/6T/1012/612, PA 6T/BACT and PA 6T/BACT/66.

According to a further preferred embodiment of the present invention, the at least one partially crystalline, partially aromatic polyamide (A) is free of lactams and ω-amino acids.

According to a further preferred embodiment of the present invention, the partially crystalline, partially aromatic polyamide (A) is PA 6T/66, formed from:

50 mol % 1,6-hexanediamine, 14 to 40 mol %, preferably 20 to 35 mol %, more preferably 25 to 30 mol % terephthalic acid, and 10 to 36 mol %, preferably 15 to 30 mol %, more preferably 20 to 25 mol % 1,6-hexanoic acid.

Component (B)

The at least one functionalized impact modifier is preferably selected from the group consisting of polyethylene, polypropylene, polyolefin copolymers, acrylate copolymers, acrylic acid copolymers, vinyl acetate copolymers, styrene copolymers, styrene block copolymers, ionic ethylene copolymers in which the acid groups are partially are neutralized with metal ions, core-shell impact modifiers and mixtures thereof.

According to a preferred embodiment of the present invention, component (B) is functionalized by copolymerization and/or by grafting. For this purpose, a compound selected from the group consisting of unsaturated carboxylic acids, unsaturated carboxylic acid derivatives and mixtures thereof and/or unsaturated glycidyl compounds is more preferably used. This compound is more preferably selected from the group consisting of unsaturated carboxylic acid esters, particularly acrylic acid esters and/or methacrylic acid esters, unsaturated carboxylic acid anhydrides, particularly maleic anhydride, glycidyl acrylic acid, glycidyl methacrylic acid, α-ethyl acrylic acid, maleic acid, fumaric acid, itaconic acid, citraconic acid, aconitic acid, tetrahydrophthalic acid, butenyl succinic acid and mixtures thereof.

If the functionalization is carried out by copolymerization, the proportion by weight of each individual compound used for the functionalization is preferably in the range from 3 to 25 wt. %, more preferably from 4 to 20 wt. % and especially preferably from 4.5 to 15 wt. %, each based on the total weight of component (B).

In so far as the functionalization is carried out by grafting, the proportion by weight of each individual compound used for the functionalization is preferably in the range from 0.3 to 2.5 wt. %, more preferably from 0.4 to 2.0 wt. % and especially preferably from 0.5 to 1.9 wt. %, each based on the total weight of component (B).

Impact modifiers functionalized by copolymerization can additionally also be functionalized by grafting.

The polyolefin copolymers are preferably selected from the group consisting of ethylene-α-olefin copolymers, propylene-α-olefin copolymers, ethylene-propylene copolymers, ethylene-propylene-diene copolymers, and their mixtures, where the α-olefins preferably have 3 to 18 carbon atoms. The α-olefins are more preferably selected from the group consisting of propene, 1-butene, 1-pentene, 1-hexene, 1-octene, 1-decene, 1-dodecene, and mixtures thereof.

Examples of ethylene-α-olefin copolymers are linear polyethylenes having average densities in the range from 0.941 to 0.950 g/cm$^3$ (PE-LMD), linear polyethylenes having low densities in the range from 0.911 to 0.940 g/cm$^3$ (PE-LLD), linear polyethylenes having very low densities in the range from 0.900 to 0.910 g/cm$^3$ (PE-VLD), linear polyethylenes having ultra-low densities in the range from 0.860 to 0.899 g/cm$^3$ (PE-ULD), ethylene-propylene copolymers, ethylene-1-butene copolymers or mixtures thereof.

Among the ethylene-α-olefin copolymers, ethylene-propylene copolymers, ethylene-1-butene copolymers, ethylene-propylene-1-butene copolymers, or mixtures thereof are preferred.

Among the ethylene-propylene-1-butene copolymers, copolymers are preferred in which the monomers ethylene e), propylene f) and 1-butene g) are used in the following molar fractions:
- e) ethylene: 65 to 90 mol %, preferably 65 to 87 mol %, more preferably 71 to 84 mol %;
- f) propylene: 8 to 33 mol %, preferably 10 to 25 mol %, more preferably 12 to 20 mol %; and
- g) 1-butene: 2 to 25 mol %, preferably 3 to 20 mol %, more preferably 4 to 15 mol %, even more preferably 4 to 9 mol %;

wherein the monomers e) to g) add up to 100 mol %.

The ethylene-propylene-1-butene copolymer can comprise the monomers e) to g) mentioned in the specified preferred molar fractions, but the designation ethylene-propylene-1-butene copolymer also includes the possibility that a plurality of copolymers are mixed which each contain two of the monomers e) to g), that is, e) and f), e) and g) or f) and g), so that the monomers e) to g) are present in the mixture in the preferred molar fractions. Such a mixture more preferably consists of a copolymer of the monomers e) and f) and a copolymer of the monomers e) and g), so that the monomers e) to g) are present in the preferred molar fractions in the mixture.

The acrylate copolymers, acrylic acid copolymers or vinyl acetate copolymers are preferably selected from the group consisting of ethylene-acrylic acid copolymers, ethylene-methacrylic acid copolymers, ethylene-methacrylic acid-acrylate copolymers, ethylene-acrylic acid-acrylate copolymers, ethylene-glycidyl-methacrylate copolymers, ethylene-acrylic acid ester-glycidyl-methacrylate copolymers, ethylene-vinyl acetate copolymers, ethylene-acrylate copolymers and mixtures thereof.

The styrene copolymers are preferably styrene copolymers having a comonomer selected from the group consisting of butadiene, isoprene, acrylate and mixtures thereof.

The styrene block copolymers are preferably selected from the group consisting of styrene-butadiene-styrene triblock copolymers (SBS), styrene-isoprene-styrene triblock copolymers (SIS), styrene-ethylene/butylene-styrene triblock copolymer (SEBS), styrene-ethylene/propylene-styrene triblock copolymer (SEPS) and mixtures thereof.

The styrene-ethylene/butylene-styrene triblock copolymers are linear triblock copolymers made of an ethylene/butylene block and two styrene blocks.

The styrene-ethylene/propylene-styrene triblock copolymers are linear triblock copolymers made of an ethylene/propylene block and two styrene blocks.

The styrene fraction in the styrene-ethylene/butylene-styrene triblock copolymers or styrene-ethylene/propylene-styrene triblock copolymers is preferably from 20 to 45 wt. %, more preferably from 25 to 40 wt. % and even more preferably from 25 to 35 wt. %.

The styrene-ethylene/butylene-styrene triblock copolymers preferably have an MVR of 90 to 160 cm$^3$/10 min, more preferably from 100 to 150 cm$^3$/10 min and even more preferably from 110 to 140 cm$^3$/10 min. The MVR is measured at 275° C. and 5 kg according to ISO 1133.

The ionic ethylene copolymers preferably consist of the monomers selected from the group consisting of ethylene, propylene, butylene, acrylic acid, acrylate, methacrylic acid, methacrylate and mixtures thereof, wherein the acid groups are partially neutralized with metal ions; ethylene-methacrylic acid copolymers or ethylene-methacrylic acid-acrylate copolymers in which the acid groups are partially neutralized with metal ions are more preferred. The metal ions used for neutralization are preferably sodium, zinc, potassium, lithium, magnesium ions and mixtures thereof; sodium, zinc and magnesium ions are more preferred.

In core-shell impact modifiers, the core preferably consists of diene monomers, aromatic vinyl monomers, non-aromatic vinyl monomers and mixtures thereof and optionally crosslinking monomers. In core-shell impact modifiers, the shell preferably consists of aromatic vinyl monomers, non-aromatic vinyl monomers and mixtures thereof and optionally crosslinking monomers.

The diene monomers are preferably selected from the group consisting of butadiene and isoprene and mixtures thereof.

The aromatic vinyl monomers are preferably selected from the group consisting of styrene, α-methylstyrene, p-methylstyrene, ethylstyrene, tert-butylstyrene, diphenylethylene, vinyltoluene, vinylxylene, vinylnaphthalene, isopropenylnaphthalene, divinylbenzene, vinyl acetate, phenyl acrylate, phenyl methacrylate and mixtures thereof.

The non-aromatic vinyl monomers are preferably selected from the group consisting of acrylic acid, alkyl acrylates, methacrylic acid, alkyl methacrylates and mixtures thereof.

The non-aromatic vinyl monomers are more preferably selected from the group consisting of acrylic acid, ethyl acrylate, propyl acrylate, n-butyl acrylate, iso-butyl acrylate, 2-ethylhexyl acrylate, n-octyl acrylate, decyl acrylate, lauryl acrylate, stearyl acrylate, methacrylic acid, methyl methacrylate, ethyl methacrylate, propyl methacrylate, n-butyl methacrylate, iso-butyl methacrylate, lauryl methacrylate, stearyl methacrylate, iso-bornyl methacrylate, and mixtures thereof.

The crosslinking monomers are preferably selected from the group consisting of divinylbenzene, diallyl maleate, butylene glycol diacrylate, ethylene glycol dimethacrylate, allyl methacrylate and mixtures thereof.

In a more preferred embodiment of the polyamide compound according to the invention, the impact modifier is selected from the group consisting of
  ethylene-propylene-1-butene copolymers in which the monomers ethylene e), propylene f) and 1-butene g) are used in the following molar fractions:
  - e) ethylene: 65 to 90 mol %, preferably 65 to 87 mol %, more preferably 71 to 84 mol %,
  - f) propylene: 8 to 33 mol %, preferably 10 to 25 mol %, more preferably 12 to 20 mol %, and
  - g) 1-butene: 2 to 25 mol %, preferably 3 to 20 mol %, more preferably 4 to 15 mol %, even more preferably 4 to 9 mol %, wherein components e) to g) add up to 100 mol %, and the ethylene-propylene-1-butene copolymers are grafted with 0.3 to 2.5 wt. % of maleic anhydride,
  ethylene-1-butene copolymers with 35 to 65 wt. % of 1-butene, grafted with 0.3 to 2.5 wt. % of maleic anhydride, and
  mixtures thereof.

In a more preferred embodiment of the polyamide compound according to the invention, the impact modifier is selected from the group consisting of
  ethylene-propylene-1-butene copolymers consisting of 71 to 84 mol % of ethylene e), 12 to 20 mol % of propylene f) and 4 to 9 mol % of 1-butene g), wherein components e) to g) add up to 100 mol % and the ethylene-propylene-1-butene copolymers are grafted with 0.3 to 0.9 wt. % of maleic anhydride,
  ethylene-1-butene copolymers with 40 to 60 wt. % of 1-butene, grafted with 0.9 to 1.5 wt. % of maleic anhydride, and
  mixtures thereof.

In a further more preferred embodiment of the polyamide compound according to the invention, the impact modifier is selected from the group consisting of
- a blend of ethylene-propylene copolymer and ethylene-1-butene copolymer in a weight ratio of 67:33, grafted with 0.6 wt. % of maleic anhydride,
- an ethylene-1-butene copolymer with 50 wt. % of 1-butene, grafted with 1.2 wt. % of maleic anhydride, and
- mixtures thereof.

In another more preferred embodiment of the polyamide compound according to the invention, the impact modifier is a blend of ethylene-propylene copolymer and ethylene-1-butene copolymer in a weight ratio of 67:33, grafted with 0.6 wt. % of maleic anhydride.

In another more preferred embodiment of the polyamide compound according to the invention, the impact modifier is an ethylene-1-butene copolymer with 50 wt. % of 1-butene, grafted with 1.2 wt. % of maleic anhydride.

The at least one impact modifier according to component (B) can also be used in the form of a mixture or a blend with one or more unfunctionalized impact modifiers according to component (B), wherein the degree of functionalization of the mixture or blend is within the predetermined ranges. According to a preferred embodiment, however, the polyamide compounds according to the invention do not comprise any unfunctionalized impact modifiers.

Component (C)

According to a preferred embodiment, the at least one substituted or unsubstituted metallocene has a melting temperature of 120° C. to 350° C., preferably 140° C. to 320° C., more preferably 150 to 280° C.

According to a preferred embodiment, the at least one substituted or unsubstituted metallocene has, as a central metal atom, a metal from group 3 to 12 or the lanthanoids, preferably vanadium, chromium, manganese, iron, cobalt, nickel, ruthenium, osmium, zinc, rhodium, cadmium, iridium, magnesium, lanthanum, cerium, samarium, zircon, scandium, yttrium and combinations thereof, more preferably unsubstituted or substituted bis($\eta$5-cyclopentadienyl) iron, particularly selected from the group consisting of ferrocene, 3-carboxybutyrylferrocene, 3-carboxypropionylferrocene, 6-mercaptohexylferrocene, aminomethylferrocenes, dimethylaminomethylferrocene, diphenylphosphinoferrocene, 1-ferroceneacrylonitrile, 1-ferrocenylethanol, 1,1'-bis(1-hydroxyethyl)ferrocene, 1,1'-diacetylferrocene, 1,1'-diaminoferrocene, 1,1'-dibenzoylferrocene, 1,1'-dibutylferrocene, 1,1'-diethylferrocene, 1,1'-dihexylferrocene, 1,1'-dimethylferrocene, 1,1'-divinylferrocene, 1,1'-ferrocenedicarboxaldehyde, 1,1'-ferrocenedicarboxamide, 1,1'-ferrocenedicarboxylic acid, 1,1'-ferrocenedimethanol, 1,1'-ferrocenylacetic acid, 1,1'-ferrocenylpropanoic acid, 1,1'-ferrocenylbutanoic acid, 1,1'-ferrocenylpentanoic acid, 1,2,3,4,5-pentamethylferrocene, 2-ferrocenylethanol, 3-ferrocenylpropanol, 3-ferrocenylpropanoic acid, 4-ferrocenylbutanoic acid, 5-ferrocenylpentanoic acid, acetylferrocene, α-(N,N-dimethylamino)ethylferrocene, aminoferrocene, ethyl ferrocene, ferrocenylacetic acid, ferrocenyl methanol, octyl ferrocene, ferrocenecarboxylic acid, ferrocene carboxamide, ferrocene carboxaldehyde, propyl ferrocene, hexyl ferrocene, hydroxyethyl ferrocene, benzoyl ferrocene, butyl ferrocene, methyl ferrocene, vinyl ferrocene and bis(pentamethylcyclopentadienyl)iron(II).

Bis($\eta^5$-cyclopentadienyl)iron is also referred to as ferrocene (CAS No. 102-54-5). Both terms are used synonymously in this application.

The substituted metallocene can be monosubstituted or polysubstituted on one or both cyclopentadienyl rings. In the case that both cyclopentadienyl rings are substituted, they can be the same or different substituents, preferably the same substituent. Each cyclopentadienyl ring is preferably only monosubstituted. Only one of the two cyclopentadienyl rings is more preferably substituted. Even more preferably only one of the two cyclopentadienyl rings is monosubstituted.

The substituents are preferably selected from the group consisting of alkyl, alkylene, arylene moieties, moieties of carboxylic acids, carboxylic acid derivatives, oxoalkanoic acids, alcohols, amines and moieties of phosphorus-containing substituents.

The substituents are preferably selected from the group consisting of alkyl moieties having 1 to 12 C atoms, alkylene moieties having 2 to 12 C atoms, aryl moieties having 6 to 12 C atoms, moieties of carboxylic acids having 1 to 12 C atoms, carboxylic acid esters having 2 to 20 C atoms, carboxylic anhydrides having 2 to 12 C atoms, oxoalkanoic acids having 1 to 12 C atoms, alcohols having 1 to 12 C atoms, amines having 0 to 12 C atoms and moieties of phosphorus-containing substituents.

The substituents are more preferably selected from the group consisting of alkyl moieties having 1 to 9 C atoms, alkylene moieties having 2 to 9 C atoms, aryl moieties having 6 to 9 C atoms, moieties of carboxylic acids having 1 to 9 C atoms, carboxylic acid esters having 2 to 18 C atoms, carboxylic anhydrides having 2 to 9 C atoms, oxoalkanoic acids having 1 to 9 C atoms, alcohols having 1 to 9 C atoms, amines having 0 to 9 C atoms and moieties of phosphorus-containing substituents.

The substituents are particularly preferably selected from the group consisting of alkyl moieties having 1 to 6 C atoms, alkylene moieties having 2 to 6 C atoms, aryl moieties having 6 to 7 C atoms, moieties of carboxylic acids having 1 to 6 C atoms, carboxylic acid esters having 2 to 14 C atoms, carboxylic anhydrides having 2 to 6 C atoms, oxoalkanoic acids having 1 to 6 C atoms, alcohols having 1 to 6 C atoms, amines having 0 to 6 C atoms and moieties of phosphorus-containing substituents.

According to a preferred embodiment of the present invention, the at least one unsubstituted or substituted metallocene bis($\eta^5$-cyclopentadienyl)iron is selected from the group consisting of ferrocene, 3-carboxybutyrylferrocene, 3-carboxypropionylferrocene, 6-mercaptohexylferrocene, aminomethylferrocene, dimethylaminomethylferrocene, diphenylphosphinoferrocene, 1-ferroceneacrylonitrile, 1-ferrocenylethanol, 1,1'-bis(1-hydroxy-ethyl)ferrocene, 1,1'-diacetylferrocene, 1,1'-diaminoferrocene, 1,1'-dibenzoylferrocene, 1,1'-dibutylferrocene, 1,1'-diethylferrocene, 1,1'-dihexylferrocene, 1,1'-dimethylferrocene, 1,1'-divinylferrocene, 1,1'-ferrocene dicarboxaldehyde, 1,1'-ferrocene dicarboxamide, 1,1'-ferrocene dicarboxylic acid, 1,1'-ferrocene dimethanol, 1,1'-ferrocenylacetic acid, 1,1'-ferrocenylpropanoic acid, 1,1'-ferrocenylbutanoic acid, 1,1'-ferrocenylpentanoic acid 1,2,3,4,5-penta-methylferrocene, 2-ferrocenylethanol, 3-ferrocenylpropanol, 3-ferrocenylpropanoic acid, 4-ferrocenylbutanoic acid, 5-ferrocenylpentanoic acid, acetylferrocene, α-(N,N-dimethylamino)ethyl ferrocene, aminoferrocene, ethyl ferrocene, ferrocenylacetic acid, ferrocenyl methanol, octyl ferrocene, ferrocenecarboxylic acid, ferrocene carboxamide, ferrocene carboxy aldehyde, propyl ferrocene, hexyl ferrocene, hydroxyethyl ferrocene, benzoylferrocene, butylferrocene, methylferrocene, vinylferrocene and bis(pentamethylcyclopentadienyl)iron (II).

According to a more preferred embodiment of the present invention, the at least one unsubstituted or substituted metallocene bis($\eta^5$-cyclopentadienyl)iron is selected from the group consisting of ferrocene, aminoferrocene, 1,1'-diaminoferrocene, ferrocenecarboxylic acid, 1,1'-ferrocenedicarboxylic acid, aminomethylferrocene, 1,1'-bis(aminomethyl)ferrocene, dimethylaminomethylferrocene, 1,1'-bis(dimethylaminomethyl)ferrocene, ferrocenylacetic acid, 1,1'-ferrocenylacetic acid, ferrocenylmethanol, 1,1'-ferrocene dimethanol, ferrocene carboxaldehyde, 1,1'-ferrocene dicarboxaldehyde, acetyl ferrocene, 1,1'-diacetyl ferrocene, methyl ferrocene and 1,1'-dimethylferrocene.

According to a further more preferred embodiment of the present invention, the at least one unsubstituted or substituted metallocene bis($\eta^5$-cyclopentadienyl)iron is selected from the group consisting of ferrocene, amino ferrocene, 1,1'-diaminoferrocene, ferrocenecarboxylic acid, 1,1'-ferrocenedicarboxylic acid, aminomethylferrocene, 1,1'-bis(aminomethyl)ferrocene, ferrocenylacetic acid and 1,1'-ferrocenylacetic acid.

According to a very more preferred embodiment of the present invention, the at least one unsubstituted or substituted metallocene is ferrocene.

Component (D)

According to a preferred embodiment of the present invention, the at least one additive (component (D)) is selected from the group consisting of inorganic stabilizers differing from component (C), organic stabilizers, particularly antioxidants, antiozonants, light stabilizers, UV stabilizers, UV absorbers or UV blockers, IR absorbers, NIR absorbers, antiblocking agents, nucleating agents, crystallization accelerators, crystallization retarders, chain-extending additives, conductivity additives, release agents, lubricants, dyes, marking agents, inorganic pigments, organic pigments, carbon black, graphite, carbon nanotubes, graphene, titanium dioxide, zinc sulfide, zinc oxide, barium carbonate, barium sulfate, photochromic agents, antistatic agents, mold release agents, optical brighteners, halogen-free flame retardants, metallic pigments, metal flakes, metal-coated particles, fibrous or needle-shaped fillers, particulate fillers and mixtures thereof.

In a more preferred embodiment of the present invention, the at least one additive (component (D)) is selected from the group consisting of organic stabilizers, particularly antioxidants, antiozonants, light stabilizers, UV stabilizers, UV absorbers or UV blockers, IR absorbers, NIR absorbers, antiblocking agents, nucleating agents, crystallization accelerators, crystallization retarders, chain-extending additives, conductivity additives, release agents, lubricants, dyes, marking agents, inorganic pigments, organic pigments, carbon black, graphite, carbon nanotubes, graphene, titanium dioxide, zinc sulfide, zinc oxide, barium carbonate, barium sulfate, photochromic agents, antistatic agents, mold release agents, optical brighteners, halogen-free flame retardants, metallic pigments, metal flakes, metal-coated particles, particulate fillers and mixtures thereof.

Among the organic stabilizers, phenol compounds, phosphite compounds, phosphonite compounds, hindered amine-based stabilizers (HALS) or the mixtures thereof are more preferred.

The particulate fillers are preferably selected from the group consisting of dolomite, silicates, quartz, talc, mica, kaolin, perlite, silica, precipitated or pyrogenic silicas, diatomaceous earth, titanium dioxide, magnesium carbonate, magnesium hydroxide, aluminum hydroxide, ground or precipitated calcium carbonate, zinc oxide, zinc sulfide, chalk, lime, limestone powder, slate powder, feldspar, barium carbonate, barium sulfate, synthetic phyllosilicates, natural phyllosilicates, permanent magnetic or magnetizable metals or alloys, glass flakes, glass spheres, hollow glass spheres, hollow spherical silicate fillers and mixtures thereof.

The particulate fillers are more preferably selected from the group consisting of silicates, quartz, talc, mica, kaolin, perlite, silica, precipitated or fumed silica, diatomaceous earth, titanium dioxide, magnesium carbonate, magnesium hydroxide, aluminum hydroxide, ground or precipitated calcium carbonate, chalk, lime, lime stone powder, slate powder, feldspar, barium carbonate, barium sulfate, synthetic phyllosilicates, natural phyllosilicates, glass flakes, glass spheres, hollow glass spheres, hollow silica sphere fillers, and mixtures thereof.

The particulate fillers are even more preferably selected from the group consisting of silicates, talc, mica, kaolin, titanium dioxide, ground or precipitated calcium carbonate, chalk, lime stone powder, slate powder, synthetic phyllosilicates, natural phyllosilicates, glass flakes, glass spheres, hollow glass spheres, and mixtures thereof.

The at least one additive can also be added in master batch form. A polyamide or polyolefin is preferably used as the base polymer of the master batch. The polyamide is preferably selected from the group consisting of PA 6, PA 66, PA 6/12, PA 6/66, PA 6/69, PA 12, PA 1012, PA 1212 and mixtures thereof or consists of polyamide (A).

Molds

According to the invention, molds are also provided which can be produced from or comprise the compounds described above. The molds according to the invention can be produced from the polyamide compound according to the invention by the usual processing techniques, such as injection molding, extrusion or blow molding, particularly by injection molding. These are preferably molds from the automotive sectors, particularly in the engine compartment, electrical, electronic, mechanical engineering, energy generation and energy supply.

A preferred embodiment provides that the mold is selected from the group consisting of cylinder head covers, engine covers, housings, fastening elements such as brackets, holders, clips, cable ties, dowels or rivets and parts for charge air coolers, charge air cooler flaps, intake pipes, particularly intake manifolds, exhaust pipes, connectors, gear wheels, fan wheels, cooling water tanks, housings or parts of heat exchangers, coolant coolers, thermostats, water pumps, radiators, fastening parts, circuit boards, foils, cables, housings and parts of electrical/electronic devices, housings and parts of fan heaters, switches, distributors, relays, resistors, capacitors, coils, lamps, diodes, LEDs, transistors, connectors, controllers, memories and sensors.

Uses

The present invention further relates to the use of the above-defined polyamide compound according to the invention for the production of molds, preferably parts or components for the automotive sector, particularly in the engine compartment, electrical, electronic, mechanical engineering, power generation, power supply, such as cylinder head covers, engine covers, housings, fastening elements such as clips, holders, clips, cable ties, dowels or rivets and parts for charge air coolers, charge air cooler flaps, intake pipes, particularly intake manifolds, exhaust pipes, connectors, gears, fan wheels, cooling water tanks, housings or parts of heat exchangers, coolant radiators, thermostats, water pumps, heating elements, circuit boards, foils, cables, housings and parts of electrical/electronic devices, housings and parts of fan heaters, switches, distributors, relays, resistors, capacitors, coils, lamps, diodes, LEDs, transistors, connectors, regulators, memories and sensors.

Measurement methods, storage conditions and production of the test specimens

Relative Viscosity:

The relative viscosity was determined according to ISO 307 (2007) at 20° C. For this purpose, 0.5 g polymer granules was weighed into 100 ml m-cresol, and the calculation of the relative viscosity (RV) according to RV=t/$t_0$ was carried out based on Section 11 of the standard.

Melting Point and Heat of Fusion:

The determination was carried out on granules according to ISO 11357-3 (2013).

The differential scanning calorimetry (DSC) was carried out for each of the two heating processes with a heating rate of 20 K/min. After the first heating, it is cooled down at 20 K/min. The melting point and the heat of fusion are determined during the second heating. The temperature at the peak maximum is specified as the melting temperature.

MFR (Melt Flow Rate) and MVR (Melt Volume Rate)

The determination was carried out according to ASTM D 1238 at a temperature of 230° C. and a load of 2.16 kg.

Tear Strength and Elongation at Break:

The determination was carried out according to ISO 527 with a pulling speed of 50 mm/min at a temperature of 23° C. The test specimens used were ISO tension rods (type A1, dimensions 170×20/10×4) that were stored at elevated temperature and then cooled, manufactured according to the standard: ISO/CD 3167 (2003). Before the tensile test, the ISO tension rods were kept for at least 48 h at room temperature in a dry environment, that is, over silica gel, to cool down.

Storage Conditions:

Storage was in a drying cabinet at 180° C.

Sampling took place at the same time for all storage, namely after 504 h, 1008 h, 1512 h and 2016 h. For each material and storage time, 5 ISO tension rods (type A1, dimensions 170×20/10×4, produced according to the standard: ISO/CD 3167 (2003)) were stored and the arithmetic mean of the 5 measured values was calculated.

Production of the Test Specimen:

Granules having a water content of less than 0.1 wt. % were used to produce the ISO tension rods.

The ISO tension rods were manufactured on an injection molding machine from Arburg, model Allrounder 420 C 1000-250. Cylinder temperatures that increase and decrease from the feed to the nozzle were used.

Cylinder temperatures: 280 to 340° C.

Mold temperature: 60° C.

Unless otherwise stated, the test specimens were used in the dry state; for this purpose, they were stored in a dry environment, that is, over silica gel, at room temperature for at least 48 h after injection molding.

General Production Instructions for the Polyamide Compounds According to the Invention To produce the polyamide compound according to the invention, components (A), (C) and optionally (B) and optionally (D) are mixed in conventional compounding machines, such as single- or twin-screw extruders or screw kneaders. The components are dosed individually via gravimetric or volumetric weigh feeder into the feed or each into a side feeder or fed in the form of a dry blend.

If additives (component (D)) are used, said additives can be introduced directly or in the form of a master batch. The carrier material of the master batch is preferably a polyamide or a polyolefin. The polyamide is preferably selected from the group consisting of PA 6, PA 66, PA 6/12, PA 6/66, PA 6/69, PA 12, PA 1012, PA 1212 and mixtures thereof or polyamide (A).

For dry blend production, the dried granules of the polyamide (A), component (C) and, optionally, the granules of the impact modifier (B) and, optionally, the additives (D) are mixed in a closed container. This mixture is homogenized for 10 to 40 minutes using a tumble mixer, drum wheel mixer or tumble dryer. This can be done under a dried protective gas to avoid moisture absorption.

The compounding takes place at set cylinder temperatures of 260 to 340° C., wherein the temperature of the first cylinder can be set to 50 to 100° C. Degassing can take place in front of the nozzle. This can be done by vacuum or atmospheric means. The melt is discharged in strand form, cooled in a water bath at 10 to 80° C. and then granulated. Alternatively, the melt can also be pressed through a perforated plate with a cutting device into a water bath and the cut granules can be separated in a post-treatment section (underwater granulation). The granules are dried at a maximum of 100° C. under nitrogen or in a vacuum to a water content of less than 0.1 wt. %.

The subject according to the invention is intended to be explained in more detail on the basis of the following examples, without wishing to restrict it to the specific embodiments shown here.

EXAMPLES AND COMPARATIVE EXAMPLES

Raw Materials

The materials used in the examples and comparative examples are summarized in Table 1.

TABLE 1

| Materials used in the examples and comparison examples | | |
|---|---|---|
| Components | Description | Manufacturer |
| Polyamide 6T/66 (A) | Partly crystalline polyamide made from 1,6-hexanediamine (50 mol %), terephthalic acid (26 mol %) and 1,6-hexanedioic acid (24 mol %) RV 1.69 (measured with 0.5 g in 100 ml m-cresol at 20° C.) Melting temperature 310° C. Heat of fusion 60 J/g | EMS-CHEMIE AG, Switzerland |

TABLE 1-continued

Materials used in the examples and comparison examples

| Components | Description | Manufacturer |
|---|---|---|
| Polyamide 6 | Partly crystalline polyamide made from ε-caprolactam RV 1.80 (measured with 0.5 g in 100 ml m-cresol at 20° C.) Melting temperature 222° C. | EMS-CHEMIE AG, Switzerland |
| Polyamide 66 | Partially crystalline polyamide 66 made from 1,6-hexanediamine and 1,6-hexanedioic acid RV 1.79 (measured with 0.5 g in 100 ml m-cresol at 20° C.) Melting point 261° C. Trade name: Radipol A45 | RadiciChimica SpA, Italy |
| Impact modifier (B1) | Ethylene-1-butene copolymer with 50 wt. % of 1-butene 1.2 wt. % of maleic anhydride MFR* 1.2 g/10 min at 230° C. and 2.16 kg Trade name: Tafmer MH5020C | Mitsui Chemicals, Japan |
| Impact modifier (B2) | Blend of ethylene-propylene copolymer and ethylene-1-butene copolymer in a weight ratio of 67:33 0.6 wt. % of maleic anhydride MVR** 1.3 cm$^3$/10 min at 230° C. and 2.16 kg Trade name: Tafmer MC201 | Mitsui Chemicals, Japan |
| Ferrocene (C) | Bis(η5-cyclopentadienyl)iron, CAS No. 102-54-5 Trade name: Plutocene F-C | Innospec Deutschland GmbH, Germany |
| Black master batch (D1) | Carbon black master batch based on polyethylene with 40 wt. % of carbon black Trade name: Euthylen Black 00-6005 C4 | BASF Color Solutions, Germany |
| Okabest AO 445F (D2) | 4,4'-bis(phenylisopropyl)diphenylamine CAS No. 10081-67-1 | Oka-Tec GmbH, Germany |
| KI:Ca stearate 98:2 wt. % (D3) | Mixture of potassium iodide (CAS No. 7681-11-0) and calcium stearate (CAS No. 1592-23-0) in a weight ratio of 98:2 Trade name: Adnol TS P rod | Liquichem Handelsgesellschaft mbH, Germany |
| CuI (D4) | Copper iodide, CAS No. 7681-65-4 | Liquichem Handelsgesellschaft mbH, Germany |

*RV relative viscosity measured at solution of 0.5 g polyamide in 100 ml m-cresol at 20° C.
*melt flow rate
**melt volume rate Production of the Polyamide Compound According to Example 1

The dried granules of the polyamide (A), the impact modifier (B1), the ferrocene (C) and the additive (D1) were mixed to form a dry blend in the ratio specified in Table 2. This mixture was homogenized for about 20 minutes by means of a tumble mixer.

The polyamide compound was produced on a ZSK 25 twin-screw extruder from Werner & Pfleiderer. The dry blend was dosed into the feed via a weigh feeder.

The temperature of the first housing was set to 50° C., that of the remaining housings was set to 260 to 330° C. A rotary speed of 200 rpm and a throughput of 13 kg/h were used. It was not degassed. The melt strand was cooled in a water bath, cut, and the granules obtained were dried at 100° C. for 24 h in vacuo (30 mbar) to a water content of less than 0.1 wt. %.

The results of the examples and comparative examples according to the present invention are summarized in Tables 2 to 4 below.

TABLE 2

Tear strength in MPa and in % of the initial value

| | | Examples | | Comparison examples | |
|---|---|---|---|---|---|
| | Unit | 1 | 2 | 3 | 4 |
| PA 6T/66 (A) | wt. % | 79.0 | 74.0 | 34.45 | 79.4 |
| PA 6 | wt. % | — | — | 10.0 | — |
| PA 66 | wt. % | — | — | 34.45 | — |
| Impact modifier (B1) | wt. % | 18.0 | — | 18.0 | 18 |
| Impact modifier (B2) | wt. % | — | 23.0 | — | — |
| KI:Ca-stearate 98:2 wt.-% (D3) | wt. % | — | — | 0.5 | 0.5 |
| CuI (D4) | wt. % | — | — | 0.1 | 0.1 |
| Okabest AO 445F (D2) | wt. % | — | — | 0.5 | — |
| Ferrocene (C) | wt. % | 1.0 | 1.0 | — | — |
| Black master batch (D1) | wt. % | 2.0 | 2.0 | 2.0 | 2.0 |
| Spiral flow test | mm | 309 | 288 | 259 | |

TABLE 2-continued

Tear strength in MPa and in % of the initial value

| Storage time | — | Tear strength | | | | | | | |
|---|---|---|---|---|---|---|---|---|---|
| | | MPa | % | MPa | % | MPa | % | MPa | % |
| 0 | h | 49 | 100 | 44 | 100 | 43 | 100 | 49 | 100 |
| Storage temeprature 180° C. | | | | | | | | | |
| 504 | h | 48 | 98 | 43 | 98 | 42 | 98 | 29 | 59 |
| 1008 | h | 46 | 94 | 42 | 95 | 38 | 88 | 24 | 49 |
| 1512 | h | 45 | 92 | 41 | 93 | 32 | 74 | 19 | 39 |
| 2016 | h | 45 | 92 | 38 | 86 | 26 | 60 | 20 | 41 |

TABLE 3

Elongation at break in %

| | | Examples | | Comparison examples | |
|---|---|---|---|---|---|
| | Unit | 1 | 2 | 3 | 4 |
| PA 6T/66 (A) | wt. % | 79 | 74 | 34.45 | 79.4 |
| PA 6 | wt. % | — | — | 10 | — |
| PA 66 | wt. % | — | — | 34.45 | — |
| Impact modifier (B1) | wt. % | 18 | — | 18 | 18 |
| Impact modifier (B2) | wt. % | — | 23 | — | — |
| KI:Ca-stearate 98:2 wt.-% (D3) | wt. % | — | — | 0.5 | 0.5 |
| CuI (D4) | wt. % | — | — | 0.1 | 0.1 |
| Oka best AO 445F (D2) | wt. % | — | — | 0.5 | — |
| Ferrocene (C) | wt. % | 1.0 | 1.0 | — | — |
| Black master batch (D1) | Gew.-% | 2.0 | 2.0 | 2.0 | 2.0 |

| Storage time | — | Elongation at break | | | |
|---|---|---|---|---|---|
| | | % | % | % | % |
| 0 | h | 44 | 33 | 58 | 31 |
| Storage temperature 180° C. | | | | | |
| 504 | h | 18 | 17 | 5.8 | 1.7 |
| 1008 | h | 23 | 16 | 3.4 | 1.3 |
| 1512 | h | 10 | 11 | 2.0 | 1.0 |
| 2016 | h | 13 | 6.2 | 1.5 | 1.0 |

Discussion of the Results

The results of Tables 2 and 3 show that the polyamide compounds of Examples 1 and 2 according to the invention with ferrocene (C) as a stabilizer compared to the polyamide compound of Comparative Example 3, which comprises an inorganic stabilization from components (D2) and (D3), after storage of the test specimens produced from the polyamide compounds at 180° C., have both improved retention of tear strength and elongation at break.

What is claimed is:

1. A polyamide compound comprising:
(A) 32 to 89.6 wt. % of at least one partially crystalline, partially aromatic polyamide,
(B) 10 to 30 wt. % of at least one impact modifier, which is (i) a copolymer of a monomer selected from the group consisting of ethylene, propylene, an acrylate monomer, acrylic acid, vinyl acetate, and styrene with a monomer selected from the group consisting of an unsaturated carboxylic acid, an unsaturated carboxylic acid derivative, and an unsaturated glycidyl compound, or which is (ii) a functionalized polymer formed by grafting a polymer selected from the group consisting of polyethylene, polypropylene, a polyolefin copolymer, an acrylate copolymer, an acrylic acid copolymer, a vinyl acetate copolymer, a styrene copolymer, ionic ethylene copolymer in which the acid group or acid groups are partially neutralized with metal ions, and a core-shell impact modifier, with a compound selected from the group consisting of an unsaturated carboxylic acid, unsaturated carboxylic acid derivative, and unsaturated glycidyl compound,
(C) 0.01 to 3.0 wt. % of at least one substituted or unsubstituted metallocene, wherein the unsubstituted metallocene is not ferrocene, and
wherein a substituent of the at least one substituted metallocene is selected from the group consisting of alkyl, alkylene, arylene moieties, carboxylic acid moieties, moieties of carboxylic acid derivatives, oxoalkanoic acids, alcohols, amines, and moieties of phosphorus-containing substituents, or wherein the at least one substituted metallocene is selected from the group consisting of 3-carboxybutyrylferrocene, 3-carboxypropionylferrocene, 6-mercaptohexylferrocene, aminomethylferrocenes, dimethylaminomethylferrocene, diphenylphosphinoferrocene, 1-ferroceneacrylonitrile, 1-ferrocenylethanol, 1,1'-bis(1-hydroxyethyl) ferrocene, 1,1'-diacetylferrocene, 1,1'-diaminoferrocene, 1,1'-dibenzoylferrocene, 1,1'-dibutylferrocene, 1,1'-diethylferrocene, 1,1'-dihexylferrocene, 1,1'-dimethylferrocene, 1,1'-divinylferrocene, 1,1'-ferrocenedicarboxaldehyde, 1,1'-ferrocenedicarboxamide, 1,1'-ferrocenedicarboxylic acid, 1,1'-ferrocenedimethanol, 1,1'-ferrocenylacetic acid, 1,1'-ferrocenylpropanoic acid, 1,1'-ferrocenylbutanoic acid, 1,1'-ferrocenylpentanoic acid, 1,2,3,4,5-pentamethylferrocene, 2-ferrocenylethanol, 3-ferrocenylpropanol, 3-ferrocenylpropanoic acid, 4-ferrocenylbutanoic acid, 5-ferrocenylpentanoic acid, acetylferrocene, a-(N,N-dimethylamino)ethylferrocene, aminoferrocene, ethyl ferrocene, ferrocenylacetic acid, ferrocenyl methanol, octyl ferrocene, ferrocenecarboxylic acid, ferrocene carboxamide, ferrocene carboxal-dehyde, propyl ferrocene, hexyl ferrocene, hydroxyethyl ferrocene, benzoyl ferrocene, butyl ferrocene, methyl ferrocene, vinyl ferrocene, and bis(pentamethylcyclopentadienyl) iron (II), and
(D) 0 to 35 wt. % of at least one additive,
wherein the at least one additive is selected from the group consisting of inorganic stabilizers differing from component (C), organic stabilizers, antiozonants, light stabilizers, UV stabilizers, UV absorbers, UV blockers, IR absorbers, NIR absorbers, antiblocking agents, nucleating agents, crystallization accelerators, crystallization retarders, chain-extending additives, conductivity additives, release agents, lubricants, dyes, marking agents, inorganic pigments, organic pigments, carbon black, graphite, carbon nanotubes, graphene, titanium dioxide, zinc sulfide, zinc oxide, barium carbonate, barium sulfate, photochromic agents, antistatic agents, mold release agents, optical brighteners, halogen-free flame retardants, metallic pigments, metal flakes, metal-coated particles, fibrous or needle-shaped fillers, and particulate fillers, components (A) to (D) adding up to 100 wt. %.

2. The polyamide compound according to claim 1, wherein the at least one partially crystalline, partially aromatic polyamide (A) has at least one of the following properties:
   a relative viscosity (RV), measured according to EN ISO 307 (2007), of 1.45 to 2.10,
   a heat of fusion, measured according to EN ISO 11357-3 (2013), of at least 25 J/g, and
   a melting temperature, measured according to EN ISO 11357-3 (2013), of at least 255° C.

3. The polyamide compound according to claim 1, wherein the at least one partially crystalline, partially aromatic polyamide (A) is formed from the monomers (a1) to (a2) and optionally (a3) and optionally (a4):
   (a1) at least one diamine selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl) methane, bis(4-amino-3-methyl-cyclohexyl) methane, bis(4-amino-3,5-dimethyl-cyclohexyl) methane, bis(aminomethyl)cyclohexane, isophoronediamine, m-xylylenediamine, and p-xylylenediamine, and
   (a2) at least one aromatic dicarboxylic acid selected from the group consisting of terephthalic acid, isophthalic acid, and naphthalenedicarboxylic acid, and
   (a3) at least one dicarboxylic acid selected from the group consisting of 1,6-hexanedioic acid, 1,9-nonanedioic acid, 1,10-decanedioic acid, 1,12-dodecanedioic acid, 1,13-tridecanedioic acid, 1,14-tetradecanedioic acid, 1,15-pentadecandoic acid, 1,16-hexadecanedioic acid, 1,17-heptadecanedioic acid, 1,18-octadecanedioic acid, cyclohexanedicarboxylic acid, and dimeric fatty acid having 36 or 44 C atoms, and
   (a4) one or more lactams or ω-amino acids selected from the group consisting of lactam-6, lactam-11, lactam-12, 1,6-aminohexanoic acid, 1,11-aminoundecanoic acid, and 1,12-aminododecanoic acid.

4. The polyamide compound according to claim 1, wherein the at least one partially crystalline, partially aromatic polyamide (A) is selected from the group consisting of PA 4T/66, PA 4T/6T, PA 4T/8T, PA 6T/8T, PA 4T/MPMDT, PA 4T/6T/MPMDT, PA 4T/4I, PA 4T/6I, PA 5T/5I, PA 6T/MPMDT, PA 6T/MPMDT/6I, PA 6T/6I, PA 6T/66, PA 6T/6, PA 6T/12, PA 6T/66/6, PA 6T/610, PA 6T/612, PA 6T/10I, PA 6T/9T, PA 6T/12T, PA 6T/6I/6, PA 6T/6I/66, PA 6T/6I/612, PA 6T/6I/12, PA 9T/MODT, PA 9T/91, PA 10T, PA 12T, PA 12T/12I, PA 10T/1012, PA 10T/6T, PA 10T/10I, PA 10T/106, PA 10T/12, PA 10T/11, PA 10T/6T/612, PA 10T/6T/10I/6I, PA 10T/6T/1012/612, PA 6T/BACT, PA 6T/BACT/66, PA 6T/6I/BACT/BACI, PA 6T/BACT/MACMT, PA 6T/BACT/PACMT, PA 6T/BACT/TMDCT, PA 4T/6T/8T, PA 4T/6T/10T, PA 4T/8T/10T, and PA 6T/8T/10T.

5. The polyamide compound according to claim 1, wherein the at least one partially crystalline, partially aromatic polyamide (A) is free of lactams and ω-amino acids.

6. The polyamide compound according to claim 1, wherein the partially crystalline, partially aromatic polyamide (A) is PA 6T/66, formed from:
   50 mol % 1,6-hexanediamine,
   14 to 40 mol % terephthalic acid, and
   10 to 36 mol % 1,6-hexanoic acid;
      wherein the 14 to 40 mol % terephthalic acid and the 10 to 36 mol % 1,6-hexanoic acid add up to 50 mol %.

7. The polyamide compound according to claim 1, wherein
   the at least one impact modifier (B) is (ii) a functionalized polymer formed by grafting a polymer selected from the group consisting of polyethylene, polypropylene, and a polyolefin copolymer, with a compound selected from the group consisting of an unsaturated carboxylic acid, unsaturated carboxylic acid derivative, and unsaturated glycidyl compound.

8. The polyamide compound according to claim 1, wherein the at least one substituted metallocene has a melting temperature of 120° C. to 350° C.

9. The polyamide compound according to claim 1, wherein the at least one substituted metallocene is substituted bis($\eta^5$-cyclopentadienyl)iron.

10. The polyamide compound according to claim 1, wherein at least one particulate filler is selected from the group consisting of dolomite, silicates, quartz, talc, mica, kaolin, perlite, silica, precipitated or pyrogenic silicas, diatomaceous earth, titanium dioxide, magnesium carbonate, magnesium hydroxide, aluminum hydroxide, ground or precipitated calcium carbonate, zinc oxide, zinc sulfide, chalk, lime, limestone powder, slate powder, feldspar, barium carbonate, barium sulfate, synthetic phyllosilicates, natural phyllosilicates, permanent magnetic or magnetizable metals or alloys, glass flakes, glass spheres, hollow glass spheres, and hollow spherical silicate fillers.

11. The polyamide compound according to claim 1, wherein the polyamide compound comprises from 43 to 89.6 wt. % of component (A), from 10 to 25 wt. % of component (B), from 0.03 to 2.0 wt. % of component (C), and from 0.1 to 30 wt. % of component (D).

12. A mold produced from a polyamide compound according to claim 1.

13. The mold according to claim 12, which is a component of an automobile.

14. The mold according to claim 12, which is a component of an engine compartment, or of an electrical, electronics, mechanical engineering, power generation, or power supply component.

15. The mold according to claim 12, which is a component of a cylinder head cover, an engine cover, a housing, a fastening element, a part of charge air cooler, charge air cooler flap, intake pipe, exhaust pipe, connector, gear, fan wheel, cooling water tank, housing or part of a heat exchanger, coolant cooler, thermostat, water pump, radiator, foil, fastening part, cable, housing and/or a part of an electrical/electronic device, housing, a part of fan heater, switch, distributor, relay, resistor, capacitor, coil, lamp, diode, LED, transistor, connector, controller, memory unit, or sensor.

* * * * *